United States Patent [19]

Howard

[11] 4,084,603

[45] Apr. 18, 1978

[54] FLUID-BLENDING SYSTEM

[75] Inventor: Charles W. Howard, San Dimas, Calif.

[73] Assignee: Early California Industries, Inc., Los Angeles, Calif.

[21] Appl. No.: 733,439

[22] Filed: Oct. 18, 1976

[51] Int. Cl.² ............................................. G05D 11/03
[52] U.S. Cl. .................................... 137/88; 137/606; 137/DIG. 8
[58] Field of Search .................... 137/88, 606, DIG. 8

[56] References Cited

U.S. PATENT DOCUMENTS

| | | | |
|---|---|---|---|
| 2,587,375 | 2/1952 | Paulsen | 137/DIG. 8 |
| 2,803,264 | 8/1957 | Griswold | 137/606 UX |
| 3,250,218 | 5/1966 | Sinclair | 137/88 X |
| 3,677,296 | 7/1972 | Berger | 137/606 |

FOREIGN PATENT DOCUMENTS

| | | | |
|---|---|---|---|
| 2,053,072 | 5/1971 | Germany | 137/88 |
| 738,717 | 10/1955 | United Kingdom | 137/DIG. 8 |

Primary Examiner—Robert G. Nilson
Attorney, Agent, or Firm—Drummond, Nelson & Ptak

[57] ABSTRACT

A fluid-blending system supplies a constant preestablished ratio of two or more fluids through a common output conduit over a wide range of variations of the flow rate established through the output conduit by a pump controlling such flow rate. This constant ratio also is maintained in spite of variations in the different head pressures of the fluids supplied to the blender. Separate fluid supply chambers are used for each of the fluids to be blended and are connected in common to the output conduit. The inlet orifices for each of the fluid supply chambers are normally closed by diaphragm-controlled valves mounted in the chambers. The amount of valve opening is controlled by pressure-sensing diaphragms in response to a partial vacuum created by the demand for fluid in the output conduit. The operation of the diaphragms is such as to maintain the same absolute pressure in each of the fluid supply chambers, so that the blender system is unaffected by variations or differences in the head pressures of fluids supplied to the chambers.

10 Claims, 11 Drawing Figures

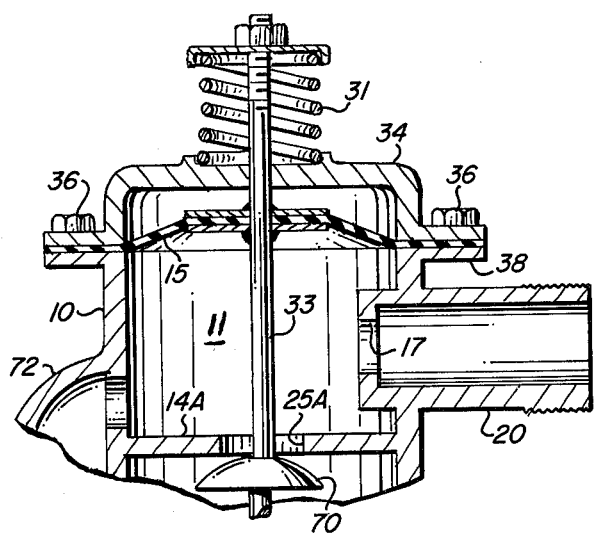
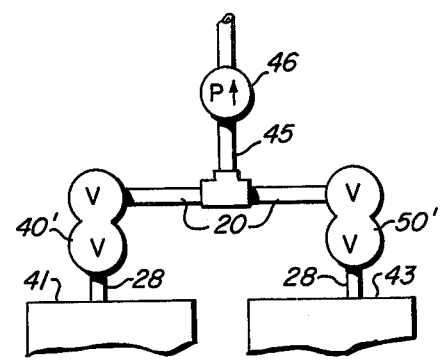
FIG-8
FIG-9
FIG-10
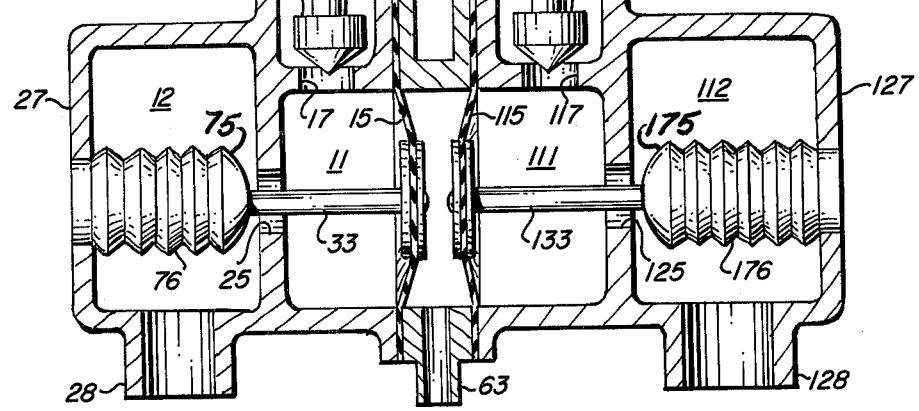
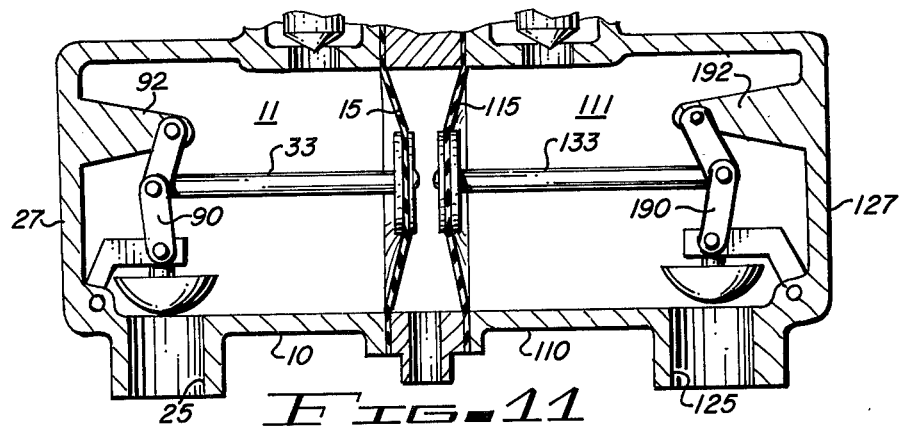
FIG-11

4,084,603

FLUID-BLENDING SYSTEM

BACKGROUND OF THE INVENTION

A number of applications exist for blending and mixing two or more fluids in controlled proportions for supply to a common output. Such applications include the blending and mixing of fire-retardant chemicals with water for extinguishing various types of fires and the blending and mixing of different components of fertilizers and insecticides with one another and with a carrier for application simultaneously as a composite mixture having fixed proportions of each of the different components. Such systems generally use a pump on the outlet conduit downstream from the blender for controlling the flow rate at which the blended mixture is applied.

Various types of mixing valves and blender devices have been devised in the past for use in such applications. A serious disadvantage of known systems, however, is that the accuracy of the ratio of fluids supplied through the output conduit for application is not constant but, instead, varies as the flow rate through the pump varies. In addition, the ratio of the amount of the different fluids in the blended output also varies as a function of the changes in head pressure of the fluids supplied to such prior-art blenders.

The inability of prior-art blenders to maintain the same ratio of fluids blended in spite of variations in the different head pressures of the fluids supplied to the blenders and in spite of variations in the flow rate or demand out of the blender through the pump controlling the flow is unacceptable for many applications. As a compromise, to overcome such shortcomings, stringent requirements often must be placed on the pressures of the fluid supplies; and the range of flow rate through the output pump must be limited. Placing these limitations on a blender system substantially reduces its versatility; and often it still is impossible to attain the desired uniformity in the blended output mixture, even if such limitations are placed on the system operation. Obviously, variations in the ratio of the blended mixtures can have substantial adverse effects, in terms of controlling the costs of the product used and in controlling the effectiveness of the resultant mixture for the purpose intended. As a consequence, it is desirable to be able to blend or proportion two or more fluids in an accurate ratio irrespective of variations in the pressures of the fluids supplied to the blender and over a wide range of flow rates from the blender in a simple and efficient manner.

SUMMARY OF THE INVENTION

Accordingly, it is an object of this invention to provide an improved fluid blender.

It is an additional object of this invention to provide an improved fluid blender which is essentially unaffected by variations in the pressures of fluids supplied to the blender.

It is an additional object of this invention to provide an improved fluid blender which maintains a constant ratio of fluids blended therein over a wide range of fluid flow from the blender.

It is a further object of this invention to provide an improved fluid blender in which the flow of the fluids supplied to the blender is closed off by valves which, in turn, are opened by an amount which varies as a function of the fluid flow demand from the blender.

In accordance with a preferred embodiment of this invention, a blender for maintaining a fixed ratio of a plurality of fluids supplied to it in its output includes a common output conduit coupled to a pump which establishes the rate of flow demand from the blender. First and second (or more) fluid supply chambers each have an outlet orifice which is connected in common with the output supply conduit and each have an inlet orifice through which the fluid for such chamber is supplied. The inlet orifices of each of the fluid supply chambers are normally closed by a valve which is opened by a diaphragm which senses a partial vacuum in the fluid supply chamber in which it is located as a function of flow demands in the output conduit. This vacuum which is sensed by the diaphragm, results in movement of the diaphragm and varies the opening of the inlet valve by an amount established by the flow rate demand in the outlet conduit to maintain a predetermined ratio of fluid pressure in the fluid supply chambers. The ratio of the fluids supplied to the output conduit then is established by the ratios of the sizes of the outlet orifices from each of the fluid supply chambers connected with the output conduit.

BRIEF DESCRIPTION OF THE DRAWINGS

FIG. 8 is a cross-sectional view of a portion of a structure which is a modification of the structure shown in FIG. 6;

FIG. 9 is a diagrammatic representation of a blender incorporating the structure of FIG. 8;

FIG. 10 is a cross-sectional view of another embodiment of a blender in accordance with the invention; and FIG. 11 is a cross-sectional view representing a modification of the structure of FIG. 10.

DETAILED DESCRIPTION

Figure 1:
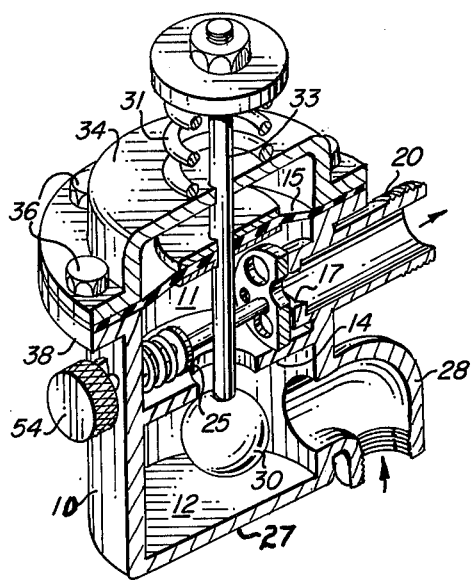
FIG. 1 is a partially cut-away perspective view showing a preferred embodiment of the invention.

Referring now to the drawings, the same or similar components are provided with the same reference numbers throughout the several figures.

FIG. 1 is a partially cut-away perspective view of a fluid supply chamber of the type which may be used in a blender constructed in accordance with the invention. The fluid supply chamber is formed in a casing 10, which has two fluid-tight chambers 11 and 12 formed in it. The chamber 11 is defined by the casing 10, an intermediate wall 14 and a flexible diaphragm 15. An outlet orifice 17 is formed in the casing 10 from the chamber 11 to permit fluids to pass outwardly from the chamber 11 into an output conduit or pipe 20. An orifice 25 is formed in the wall 14 to permit fluids to pass upwardly (as shown in FIG. 1) into the chamber 11 from the chamber 12.

The lower chamber 12 is defined by the wall 14 and casing 10 and by a lower wall 27. An inlet supply pipe or conduit 28 is connected to a suitable fluid reservoir which may be in the form of a supply tank (not shown) of relatively limited size or may be connected to a substantially unlimited fluid supply, such as provided by water mains or the like.

Normally, the orifice 25 is closed by a ball valve 30 under the control of a biasing spring 31 which forces the valve stem 33, connected to the ball valve 30, upwardly as shown in FIG. 1. The valve stem 33 is permitted to slidably pass through an upper cap 34 which, in turn, is connected by bolts 36 to a flange 38 on the casing 10 to sandwich the diaphragm 15 in place, thereby sealing off the upper side of the chamber 11. The center of the diaphragm 15 is fixedly attached to the valve stem 33, so that the diaphragm 15 and valve stem 33 are capable of limited vertical movement together. The connection between the valve stem 33 and the diaphragm 15 also is a fluid-tight connection.

Figure 2:
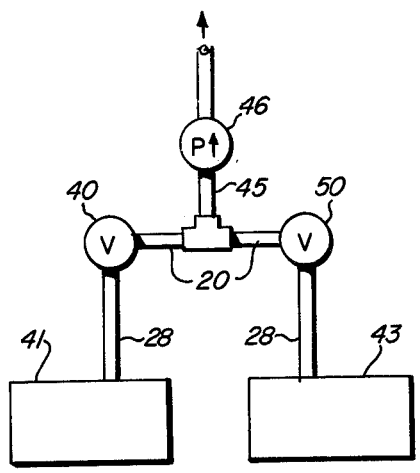
FIG. 2 is a diagrammatic representation of a blender using the structure of FIG. 1.

FIG. 2 is a diagrammatic representation of a blender incorporating two of the structures of the type shown in FIG. 1, represented in FIG. 2 as composite valve/chamber structures 40 and 50, respectively. The fluid supply for the valve/chamber structure 40 is supplied through the inlet supply pipe 28 from a suitable reservoir 41. Similarly, the fluid to be supplied to the valve/chamber 50 through the inlet pipe 28 connected to it is obtained from a reservoir 43. The output pipes 20 from the chambers 11 (shown in FIG. 1) of both of the valve/chambers 40 and 50 are connected in common to an outlet pipe 45 which has the blended fluid drawn from it under the control of a conventional pump 46.

The springs 31 which bias the valve stems 33 and diaphragm 15 upwardly to close the ball valve 30 in the orifices 25 in both of the valve/fluid supply chamber structures 40 and 50 of FIG. 2 are calibrated to close the valves with the same force. When a fluid demand is placed on the system by the pump 46, a vacuum is produced in the output pipes or conduits 20 to draw the diaphragms 15 downwardly against the action of the biasing springs 31 in an amount which is proportional to the vacuum demand. As the diaphragm 15 moves downwardly, it carries with it the valve stem 33 and opens the inlet orifice 25 by an amount which is proportional to the demand placed on the system. This occurs in both of the blending valve/chambers 40 and 50. The structure of the ball valve 30 is such that the pressure of the fluids supplied through the pipes 28 is substantially minimized. If the head pressures of the fluids supplied through the pipes 28 to the valve/chambers 40 and 50 are different, the one with the higher head pressure tends to drive its diaphragm 15 upwardly, closing down the inlet orifice 25 somewhat until the absolute pressure in the chambers 11 of both units is equalized.

The ratio of the fluid mixture then is determined solely by the ratios of the orifices 17 which interconnect the blender valve/chambers 40 and 50 with their respective outlet conduits 20. When a high demand for fluid is created by the pump 46, the diaphragms 15 are pulled downwardly a greater amount to permit a greater fluid flow through the orifices 25 from the inlet chamber portions 12 of the blender supply chambers. Conversely, as demand from the pump 46 diminishes, the valve stems 33 move upwardly as the springs 31 return toward their original position, flexing the diaphragm 15 upwardly and drawing the ball valves 30 into the orifices 25. When operation of the pump 46 ceases, terminating demand of fluid flow through the conduit 45 from the output conduits 20, the ball valves 30 are seated in the orifices 25, closing the valves in the valve/chambers 40 and 50.

Figure 3:
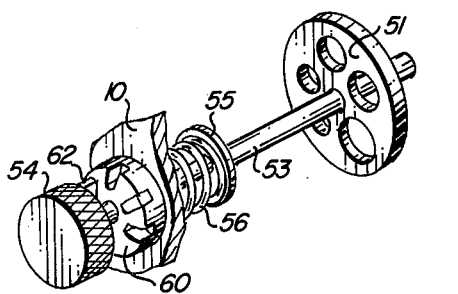
FIG. 3 shows details of the construction of a portion of the device of FIG. 1.

FIG. 3 shows details of an adjustable orifice control which is shown used in conjunction with the structure of FIG. 1. This control includes an orifice plate 51 which has a plurality of different-sized circular orifices formed in it, ranging from a relatively small orifice to a large one which normally has a diameter no more than seven-tenths the size of the inner diameter of the pipe 20. The plate 51 is eccentrically mounted with respect to the axis of the pipe 20 on a shaft 53 which extends through an opening in the casing 10 and terminates with a knurled external control knob 54. A retaining plate 55 is affixed to the shaft 53 on the portion located within the chamber 11 and a spring 56 placed between the plate 55 and the inner wall of the casing 10 biases the shaft 53 toward the right (as viewed in FIGS. 1 and 3) to cause the plate 51 to snugly engage the open end of the outlet conduit 20. The plate 51 then may be rotated under control of the knob 54 to align different ones of the circular openings in the plate 51 with the end of the conduit 20. This, in turn, causes the effective orifice in the end of the pipe 20 communicating with the chamber 11 to be changed accordingly.

To permit precise control of the alignment of the holes in the plate 51 with the pipe 20, a detent mechanism preferably is employed. In FIG. 3, the details of a type of detent mechanism which may be used are shown. This includes a slotted circular washer-like element 60 affixed to the outer wall of the casing 10 with the shaft 53 passing through it. The knob 54 carries a slot-engaging projection 62 on its under side; and to change the circular hole in the plate 51 which is aligned with the end of the conduit 20, the operator pulls the knob 54 toward the left (as viewed in FIGS. 1 and 3) against the action of the spring 56 to disengage the projection 62 from the slot in which it previously was engaged. Then the knob 54 is rotated to align the projection 62 with the slot which corresponds with the desired opening in the plate 51. The knob 54 then is released and the spring 56 returns the plate 51 into firm engagement with the end of the conduit 20 and the projection 62 engages a new slot corresponding to the desired orifice opening. Thus, by use of the mechanism shown in FIG. 3, the ratio of fluids supplied to the common conduit 45 of the blender assembly of FIG. 2 may be precisely adjusted.

In the structure described in conjunction with FIGS. 1, 2 and 3, a mechanical biasing spring 31 is used to control the movement of the pressure-sensing diaphragm 15 and, accordingly, the opening and closing of the valve 30 in the orifice 25. While this structure is capable of functioning effectively in a blender assembly of the type shown in FIG. 2, it is necessary to calibrate the springs 31 which, in turn, may result in additional expense in the construction of the blender system. Of course, there are applications where it is necessary to use this approach.

Figure 4:
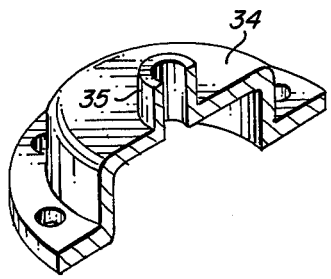
FIG. 4 shows an alternative construction of a portion of the device shown in FIG. 1.
Figure 5:
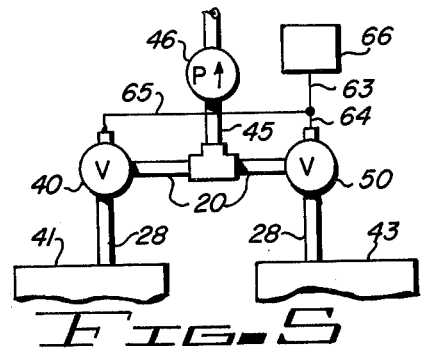
FIG. 5 is a diagrammatic representation of the structure of the embodiment modified in accordance with the alternative construction shown in FIG. 4.

If the blender is used in a vehicle having a source of power, such as a fire truck, tractor, air craft, or the like, however, it may be preferable to operate a vacuum pump from the vehicle and use a controlled vacuum in common with the chambers above each of the diaphragms 15 to perform the function of the biasing springs shown in FIG. 1. If this option is employed, the plate 34 then is constructed as shown in FIG. 4 with a hose connection flange 35 extending from it at the point where the valve stem 33 extended through the plate in the structure of FIG. 1. As shown in FIG. 5, a conventional vacuum pump 66, which may be operated in any suitable manner but most preferably is operated by the prime mover, or engine, of the vehicle on which the blender is used, then is attached to the flanges 35 by way of a vacuum hose line 63 through two parallel branches 64 and 65. These branches are secured to the flanges 35 in the caps 34 of the blender valve/chamber structures 40 and 50.

Since the chamber above the diaphragms 15 formed within the cap 34 is airtight, this vacuum acts to pull the diaphragms 15 upwardly in the same manner that the biasing spring 31 of FIG. 1 operated on the valve stem 33 to pull the diaphragm 15 upwardly. The lifting action in the structure of FIGS. 4 and 5, however, is now directly upon the diaphragm 15 instead of through the valve stem 33. The operation of the apparatus, however, in all other respects is the same. The amount of biasing force can be varied by varying the vacuum created by the vacuum pump 66, so that precise control for the particular operating conditions in which the blender is used may be effected.

Figure 6:
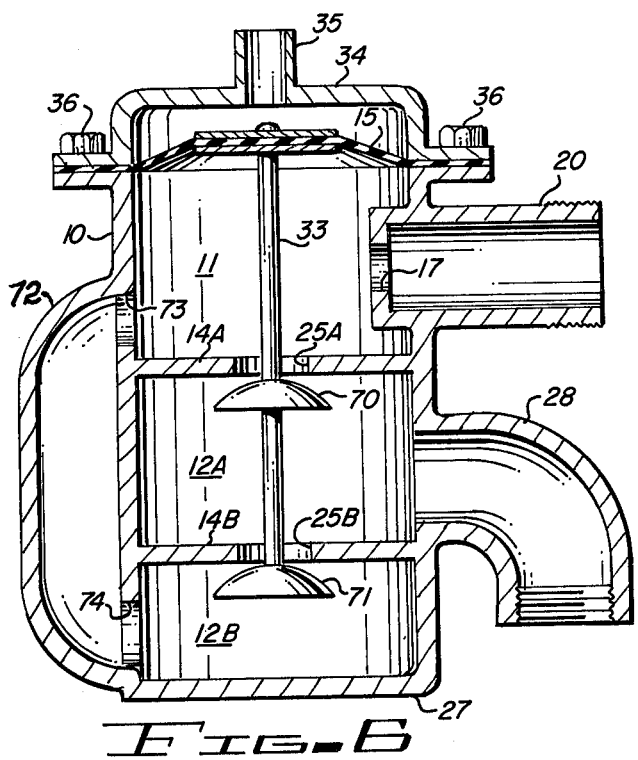
FIG. 6 is a cross-sectional view of another embodiment of a structure which may be used in place of that shown in FIG. 1.

Since the valve stem no longer needs to extend through the cap 34, it is terminated at its point of attachment to the center of the diaphragm 15, as may be seen most clearly in FIG. 6. The upper portion of the structure of FIG. 6 uses a vacuum system such as that illustrated in FIGS. 4 and 5, but in FIG. 6 a different valve arrangement is used to further minimize the effects of upstream or head pressure of the incoming fluid from the system operation.

The valve and fluid supply chamber structure of FIG. 6 is modified from that shown in FIG. 1 to divide the chamber 12 of FIG. 1 into two chambers 12A and 12B. The fluid supplied from the inlet conduit 28 is supplied to the center or intermediate chamber 12A and passes upwardly directly through an orifice 25A in the wall 14A defining the upper side of the chamber 12A, and passes downwardly through an orifice 25B in the wall 14B forming the lower side of the chamber 12A. Any fluid passing through the orifice 25B and entering the chamber 12B then passes out of the chamber 12B through an orifice 74 into an interconnecting conduit 72 which discharges the fluid in it into the chamber 11 through an orifice 73.

Figure 7:
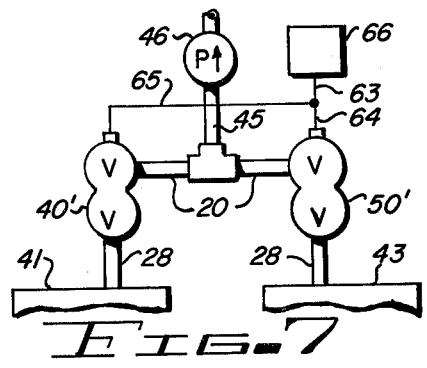
FIG. 7 is a diagrammatic representation of a blender incorporating the structure of FIG. 6.

A balanced valve is attached to the valve stem 33 and carries a pair of valve-closing members 70 and 71 for controlling the flow of fluids through the orifices 25A and 25B. The balanced valve comprising the members 70 and 71 substantially eliminates the effects of head pressure of the fluids in the pipe 28, for very low flow rate demands in the outlet conduit 20. For low flow rates, the valve members 70 and 71 nearly close off the orifices 25A and 25B. If only one of these valve members were provided in a single two-chamber device, such as the type shown in FIG. 1, it is possible that the head pressure of the fluid in the pipe 28 acting on the valve closing member would tend to force the valve member closed. In the device of FIG. 6, however, a conventional balanced valve operation is present; so that the fluid flowing downwardly through the orifice 25B tends to pull the valve stem 33 downwardly while fluid flowing upwardly through the orifice 25A tends to pull the valve stem upwardly, these two forces counteracting one another. Thus, when the structure of FIG. 6 is used in a completed blender, such as shown diagrammatically in FIG. 7, the ratio of fluid supplied to the common conduit through the pump 46 is determined solely by the ratio of the sizes of the orifices 17 of the valve/chambers 40' and 50', as described above in conjunction with the description of operation of the structure of FIG. 1.

While the structure of FIG. 6 is shown as using a vacuum biasing of the diaphragm 15 for closing the balanced valve 70, 71, a spring-biased structure of a type similar to that shown in FIG. 1 also may be employed if desired. This alternative embodiment is shown in FIG. 8, the remainder of the structure of which is identical to that shown in FIG. 6. A schematic representation of a blender employing two of the structures shown in FIG. 8 is illustrated in FIG. 9. This structure in all other respects is similar to that shown in FIG. 7 and operates in the same manner as the blender system described previously in conjunction with FIG. 2.

By using separate fluid supply chambers, as illustrated in FIGS. 1 and 6, interconnected by output conduits or pipes 20 of varying lengths, it is possible to place the different portions of the blender assembly in different locations, when the particular conditions of use or the vehicles in which the blender is used require it.

Ideally, however, in many applications, a more compact arrangement than is possible using the separately constructed fluid supply chambers of FIGS. 1 and 6 is desired. In addition, it is possible to reduce the overall cost of a blender system if a common structure for the different fluid supply chambers and the like is employed. It is apparent, particularly upon reference to the schematic representations of FIGS. 2, 5 and 7, that the common portions of the valve/chamber assemblies 40 and 50 and the outlet pipes 20, etc., may be integrated into a more compact assembly.

Referring now to FIG. 10, such an integrated, symmetrical dual-chamber blender assembly for mixing two fluids together is illustrated. The structure of FIG. 10 has further been modified to show other variations which may be employed in carrying out the invention. In the structure of FIG. 10, a pair of dual-chamber fluid supply chamber members, each comprising a pair of chambers 11 and 12 (and 111 and 112) similar to the comparable chambers of FIG. 1, are shown. The structure, however, is integrated into a single assembly which makes it much more compact than the structure of FIG. 1.

In addition, the valve-closing member for closing the orifices 25, 125 is illustrated as a structure having a valve-closing portion 75, 175 attached to a collapsible bellows 76, 176 which is attached at its opposite end to the outer wall 27, 127 of the respective ones of the two chambers 12, 112 which are illustrated in FIG. 10. These bellows present a number of corrugated surfaces in the path of the flow of fluid entering the chambers 12, 112 from the pipes 28, 128 which produce opposing forces in the direction of the longitudinal axes of the valve stems 33, 133, tending to offset the effects of pressure of the fluid in the inlet pipes 28, 128; so that the entering fluid pressure or head has minimal effect on the operation of the system at low flow rates. Thus, the ratio of the two fluids being mixed by the assembly shown in FIG. 10 is determined solely by the effective size of the outlet orifices 17, 117. As illustrated in FIG. 10, the effective sizes of these two orifices are adjusted by conventional needle valves 80, 180 in each of the two portions of the FIG. 10 assembly. The two needle valves 80, 180 may be adjusted in a conventional manner by rotation of knurled knobs 81, 181 located outside a mixing chamber 85 which is formed on the outlet side of the orifices 17, 117 in each of the chambers 11, 111 of the assembly.

By mounting the diaphragms 15, 115 in close proximity with each other and in communication with the vacuum provided through the vacuum hose 63, an identical bias is applied to both the diaphragms 15, 115. This results in highly accurate proportioning in a constant ratio over a wide range of flow rate demand in the output conduit 45 of the fluids supplied through the two inlet pipes 28, 128 from the different fluid sources.

FIG. 11 illustrates a variation of a portion of a structure similar to that in FIG. 10 but employing a different type of valve 90, 190 which, again, is of a structure which minimizes the effects of incoming fluid pressure or head at low flow rates where these effects are most significant. As stated previously in conjunction with the description of the structure of FIG. 6, the effects of the incoming fluid pressure are most significant when the valves nearly close the orifices 25, 125. With a valve structure of the type shown in FIG. 11, however, the forces operating to maintain the valves open as a result of the incoming fluid pressure are minimized since these forces do not operate through the valve stems 33, 133 in the direction of movement of the diaphragms 15, 115 but instead are applied in a nearly vertical direction, perpendicular to the valve stems 33, 133 to rigid frame members 92, 192 which are integrally formed as a part of the walls 27, 127 of the fluid supply chambers shown in FIG. 11.

In addition, it should be noted that by using a mechanical valve structure of the type shown in FIG. 11, the dual-chamber construction, employed in the other embodiments previously described, may be eliminated and only single mixing chambers 11, 111 are employed in each half of the blender for both of the fluids being mixed. Again, in all other respects, the operation of the embodiment shown in FIG. 11 is the same as that illustrated in FIG. 10, and only those portions which differ from the structure of FIG. 10 have been shown in FIG. 11.

In operation of the blender systems constructed in accordance with the above embodiments, accurate constant ratio blending has been achieved over a wide range of flow demand (0 to 40 gallons per minute). Also, several (i.e., more than two) units of valve/chambers can be connected in parallel to a single output pipe.

It will be apparent to those skilled in the art that other variations of valve arrangements, mixing chambers, biasing for closing the valves, and the like, may be employed in practicing the invention. The embodiments illustrated, therefore, are not to be considered limiting but merely as illustrative of various ways of carrying out the invention.

I claim:

1. A blender for maintaining a pre-established ratio of a plurality of fluids supplied thereto in an output thereof including, in combination:

an output conduit;

at least first and second fluid supply chambers, each having an outlet orifice coupled in common with said output supply conduit, the ratio of the sizes of said outlet orifices establishing the ratio of fluids in the output conduit of the blender, and each of said chambers having an inlet orifice for connection with a supply of fluid;

first and second valve means biased for normally closing said first and second inlet orifices, respectively and capable of opening in various amounts to permit varying amounts of fluid to pass therethrough; and first and second valve control means mounted in said first and second chambers, respectively, said valve control means responsive to fluid demand in said output conduit and coupled with said first and second valve means, respectively, for controlling the amount of opening thereof in accordance with such fluid demand.

2. The combination according to claim 1 wherein said first and second valve means are constructed to minimize the effects of the pressure of fluid supplied to said inlet orifices on the operation of said blender.

3. The combination according to claim 1 wherein said first and second fluid supply chambers each comprise a three-part chamber including an outlet chamber portion having an orifice connected in common with said output conduit, an inlet chamber portion having an inlet orifice for connection with a supply of fluid, and a third chamber portion interconnected in common with said outlet portion, said inlet chamber portion having orifices interconnecting it with both of said other portions; and wherein each of said first and second valve means comprises a balanced valve for normally closing the orifices interconnecting said inlet portion with said outlet portion and said third portion of said three-part chamber.

4. The combination according to claim 1 further including means for adjusting the orifice size of the outlet orifice in at least one of said fluid supply chambers.

5. The combination according to claim 4 wherein said means for adjusting the size of the outlet orifice in said at least one of said fluid supply chambers comprises a needle valve.

6. The combination according to claim 4 wherein the means for adjusting the size of the outlet orifice in said at least one of said fluid supply chambers comprises a rotatable plate having different-sized orifices therein aligned with the outlet orifice in said at least one of said fluid supply chambers.

7. The combination according to claim 1 wherein said first and second valve control means include first and second diaphragm means, respectively, mounted to form at least a portion of an outside wall of each of said first and second fluid supply chambers; said first and second valve means each include a valve stem connected with said first and second diaphragms, respectively; and further including means biasing said first and second diaphragms outwardly from said fluid supply chambers so that said valve means normally close said inlet orifices; fluid demand in said output conduit creating a partial vacuum in said first and second fluid supply chambers to move said first and second diaphragms inwardly by an amount corresponding to said fluid demand to open said inlet orifices by an amount sufficient to maintain a predetermined ratio of absolute fluid pressures in said fluid supply chambers substantially independent of variations in pressure of fluids supplied thereto through said inlet orifices.

8. The combination according to claim 7 wherein said means for biasing said first and second diaphragms outwardly from said fluid supply chambers comprises first and second springs, respectively.

9. The combination according to claim 7 wherein said means for biasing said first and second diaphragms outwardly from said fluid supply chambers comprises a vacuum system connected in common with said first and second diaphragms.

10. The combination according to claim 9 wherein said first and second fluid supply chambers are formed as a portion of a unitary assembly with said first and second diaphragm means mounted parallel to one another, said valve stems extend in opposite directions from the respective diaphragm means, and said vacuum system is coupled with a vacuum chamber common to both of said first and second diaphragm means.

* * * * *